United States Patent
Tsuda

(10) Patent No.: US 7,515,332 B2
(45) Date of Patent: Apr. 7, 2009

(54) GLASS COMPOSITION THAT EMITS FLUORESCENCE IN INFRARED WAVELENGTH REGION AND METHOD OF AMPLIFYING SIGNAL LIGHT USING THE SAME

(75) Inventor: Masahiro Tsuda, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 0 days.

(21) Appl. No.: 11/059,900

(22) Filed: Feb. 17, 2005

(65) Prior Publication Data

US 2005/0213197 A1 Sep. 29, 2005

Related U.S. Application Data

(60) Provisional application No. 60/550,524, filed on Mar. 5, 2004.

(30) Foreign Application Priority Data

Feb. 18, 2004 (JP) .............................. 2004-041324

(51) Int. Cl.
*C03C 13/04* (2006.01)
*C03C 3/095* (2006.01)
(52) U.S. Cl. ..................... 359/341.5; 501/64; 501/37; 501/152
(58) Field of Classification Search ................ 501/37, 501/64, 152; 359/341.5
See application file for complete search history.

(56) References Cited

U.S. PATENT DOCUMENTS

| | | | | |
|---|---|---|---|---|
| 3,627,573 A | * | 12/1971 | Schottmiller et al. | 252/62.3 R |
| 4,128,411 A | * | 12/1978 | Reisfeld et al. | 65/32.5 |
| 4,285,731 A | * | 8/1981 | Nigrin | 501/21 |
| 4,686,196 A | * | 8/1987 | Gliemeroth et al. | 501/13 |

(Continued)

FOREIGN PATENT DOCUMENTS

EP  1 221 747 A2  10/2002

(Continued)

OTHER PUBLICATIONS

"Study on Effect of Rare Earth in Blue-Purple Night-Luminous Phosphor CaS : Bi, Cu", Mao et al., Acta Scientiarum Naturalium Universitatis Normalis Hunanensis, Jun. 1992, vol. 15, No. 2, pp. 145-148.

*Primary Examiner*—Jack W. Keith
*Assistant Examiner*—Ari M Diacou
(74) *Attorney, Agent, or Firm*—Hamre, Schumann, Mueller & Larson, P.C.

(57) ABSTRACT

Conventional glass compositions including bismuth as a fluorescent element have a broad amplification wavelength region but do not allow the emission intensity in the 1.3-µm range to be sufficiently high through the excitation caused by light in the 0.8-µm and 0.98-µm ranges. The present invention provides a glass composition including: bismuth; a glass network former; and at least one element selected from the group consisting of dysprosium, erbium, ytterbium, neodymium, thulium, holmium, titanium, vanadium, chromium, manganese, iron, cobalt, nickel, copper, and molybdenum (except for tetravalent titanium and trivalent iron), wherein the glass composition emits fluorescence in an infrared wavelength region, with the bismuth functioning as a fluorescent source through irradiation of excitation light. The emission intensity is increased by the sensitization effect of the at least one element.

3 Claims, 5 Drawing Sheets

U.S. PATENT DOCUMENTS

| | | | |
|---|---|---|---|
| 5,262,363 A * | 11/1993 | Yoshida et al. | 501/17 |
| 6,266,181 B1 * | 7/2001 | Ohishi et al. | 359/341.1 |
| 6,300,264 B1 * | 10/2001 | Ohara | 501/64 |
| 6,356,387 B1 * | 3/2002 | Ohishi et al. | 359/341.5 |
| 6,403,507 B2 * | 6/2002 | Naumann et al. | 501/14 |
| 6,490,081 B1 * | 12/2002 | Feillens et al. | 359/343 |
| 6,495,482 B1 * | 12/2002 | de Sandro et al. | 501/50 |
| 6,589,895 B2 * | 7/2003 | Dejneka et al. | 501/42 |
| 6,599,853 B2 * | 7/2003 | Sugimoto et al. | 501/50 |
| 6,620,748 B1 * | 9/2003 | Sugimoto et al. | 501/64 |
| 7,144,633 B2 * | 12/2006 | Zguris et al. | 428/432 |
| 7,170,674 B2 * | 1/2007 | Kakui et al. | 359/341.5 |
| 7,313,306 B2 * | 12/2007 | Yamada et al. | 385/123 |
| 7,375,043 B2 * | 5/2008 | Fechner et al. | 501/65 |
| 2002/0041436 A1 * | 4/2002 | Kondo et al. | 359/341.5 |
| 2002/0197049 A1 * | 12/2002 | Baniel et al. | 385/142 |
| 2003/0087743 A1 * | 5/2003 | Dejneka et al. | 501/42 |
| 2004/0266603 A1 * | 12/2004 | Fechner et al. | 501/66 |
| 2005/0037913 A1 * | 2/2005 | Peuchert et al. | 501/78 |
| 2006/0001005 A1 * | 1/2006 | Kishimoto et al. | 252/301.33 |
| 2006/0025298 A1 * | 2/2006 | Emlemdi | 501/26 |
| 2006/0199721 A1 * | 9/2006 | Kishimoto et al. | 501/75 |
| 2007/0200097 A1 * | 8/2007 | Kishimoto et al. | 252/301.33 |
| 2008/0068703 A1 * | 3/2008 | Nakatsuka et al. | 359/341.5 |

FOREIGN PATENT DOCUMENTS

| | | |
|---|---|---|
| JP | 11-109152 | 4/1999 |
| JP | 2002-223022 | 8/2002 |
| JP | 2002-252397 | 9/2002 |
| JP | 2003-283028 | 10/2003 |

* cited by examiner

GLASS COMPOSITION THAT EMITS FLUORESCENCE IN INFRARED WAVELENGTH REGION AND METHOD OF AMPLIFYING SIGNAL LIGHT USING THE SAME

BACKGROUND OF THE INVENTION

1. Field of the Invention

The present invention relates to a glass composition that functions as a light emitter, a light amplification medium, etc. and a method of amplifying signal light using the glass composition.

2. Related Background Art

Glass compositions including a rare earth element such as neodymium, erbium, praseodymium, etc. have been studied as glass that emits fluorescence in the infrared wavelength region. In addition, a glass composition including bismuth as a fluorescent element has been proposed recently.

JP2002-252397A discloses an optical fiber formed of $Bi_2O_3$-$Al_2O_3$-$SiO_2$ glass including bismuth as a fluorescent element. The use of this optical fiber allows signal light to be amplified in a broader wavelength region as compared to a conventional optical fiber doped with erbium.

JP2003-283028A discloses a glass composition including a divalent metal oxide in addition to the above-mentioned components. The addition of the divalent metal oxide allows this glass composition to have excellent meltability as compared to the glass disclosed in JP2002-252397A. Furthermore, since a light amplifier including this glass composition contains bismuth as a fluorescent element, it operates in a broader wavelength region.

SUMMARY OF THE INVENTION

The glass compositions including bismuth as a fluorescent element have been developed so far with an attention directed to the broadness of the amplification wavelength region. The above-mentioned conventional glass compositions including bismuth as a fluorescent element, however, do not have a sufficiently high emission intensity in the 1.3-μm range when excited with light in 0.8-μm and 0.98-μm ranges, which are the ranges of excitation wavelengths that are used generally, particularly in the 0.98-μm range.

Accordingly, the present invention provides a glass composition that includes bismuth, a glass network former, and at least one element selected from dysprosium, erbium, ytterbium, neodymium, thulium, holmium, titanium, vanadium, chromium, manganese, iron, cobalt, nickel, copper, and molybdenum (except for tetravalent titanium and trivalent iron), and that emits fluorescence in the infrared wavelength region, with the bismuth functioning as a fluorescent source through irradiation of excitation light.

As described above, the tetravalent titanium and trivalent iron are excluded from the elements from which the above-mentioned at least one element is selected. This, however, does not mean that they cannot be added to the glass composition. The tetravalent titanium and trivalent iron may be contained arbitrarily like the other elements.

Conventional glass compositions including bismuth used as a fluorescent element can emit fluorescence in a broad wavelength region within the infrared wavelength region (the infrared region) but do not have a sufficiently high absorbance in the 0.8-μm and 0.98-μm ranges. In the glass composition of the present invention, however, since the above-mentioned at least one element absorbs excitation light and then transmits the energy thereof to bismuth, the glass composition has an increased emission intensity in the 1.3-μm range when excited in the above-mentioned ranges.

DETAILED DESCRIPTION OF THE INVENTION

Figure 1:
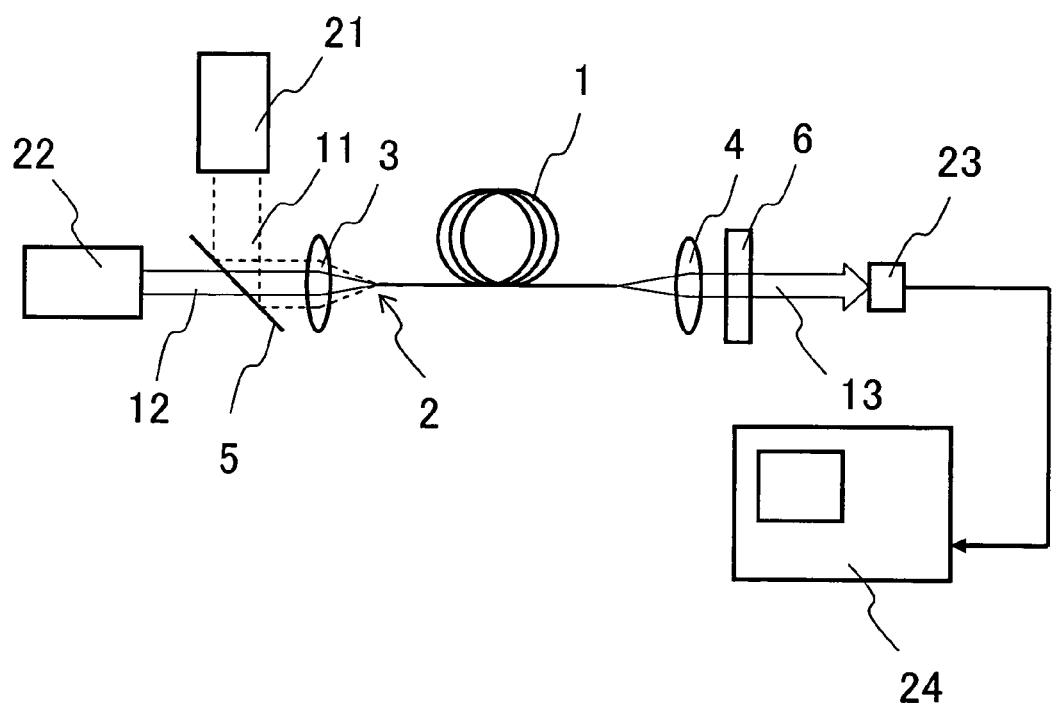
FIG. 1 is a diagram showing a configuration example of an optical system for evaluating light amplification characteristics of an optical fiber and also is a diagram showing a configuration example of the light amplifier according to the present invention.

Hereinafter, all the %-indications that indicate contents by percentage of components denote "mol %".

Bi should be present for providing the glass composition of the present invention with a fluorescence function or a light amplification function. Bi is not limited in valence, etc. as long as it can provide the fluorescence function. Bi may be contained as bismuth trioxide ($Bi_2O_3$) or bismuth pentoxide ($Bi_2O_5$). An excessively low content of Bi results in an excessively low emission intensity in the infrared region. On the other hand, an excessively high content of Bi causes an increase in nonradiation transition rate between Bi ions and a decrease in emission intensity. The content by percentage of Bi is preferably 0.01 to 15%, more preferably 0.01 to 10%, and particularly preferably 0.01 to 5% in terms of $Bi_2O_3$. The most preferable content by percentage of Bi is 0.01 to 2.0% in terms of $Bi_2O_3$.

The main causes of decreasing the emission intensity of Bi include concentration quenching, which increases as the content of Bi increases, and the coloring of the glass composition that accompanies the reduction of Bi. To suppress the concentration quenching, the content of Bi should be limited to the above-mentioned range. Adjusting the components other than Bi is effective in suppressing the reduction of Bi. When the Bi content is relatively high, the content of the components that accelerate the reduction of Bi such as alkali metal oxides and alkaline metal oxides should be limited. Specifically, when the Bi content by percentage is 1.5% or more in terms of $Bi_2O_3$, the total content by percentage expressed by $Li_2O+Na_2O+K_2O+MgO+CaO+SrO+BaO+ZnO$ is preferably 20% or less, more preferably 15% or less. When the Bi content is high, the components that can suppress the reduction of Bi such as $Fe_2O_3$ may be added to the glass composition.

The at least one element selected from the above-mentioned elements should be present as an element that provides a sensitization function. Preferably, it is at least one cation selected from $Dy^{3+}$, $Er^{3+}$, $Yb^{3+}$, $Nd^{3+}$, $Tm^{3+}$, $Ho^{3+}$, $Ti^{3+}$, $V^{3+}$, $V^{4+}$, $V^{5+}$, $Cr^{3+}$, $Cr^{6+}$, $Mn^{2+}$, $Mn^{3+}$, $Fe^{2+}$, $Co^{2+}$, $Ni^{2+}$, $Cu+$, $Cu^{2+}$, $Mo^{3+}$, and $Mo^{4+}$. When the content of this element is excessively low, a satisfactory sensitization function cannot be obtained. On the other hand, an excessively high content thereof may cause a concentration quenching phenomenon, which in turn may reduce fluorescence provided by bismuth. With consideration given to this, it is preferable that the content by percentage of the cation be 0.01 to 12%, particularly 0.01 to 8% in terms of an oxide thereof The cation may be selected suitably according to the wavelength of excitation light. When using excitation light in the 0.98-μm range (a wavelength range of 900 nm to 1100 nm), a suitable cation is at least one cation selected from $Dy^{3+}$, $Er^{3+}$, $Yb^{3+}$, $Ho^{3+}$, $Ti^{3+}$, $V^{3+}$, $V^{4+}$, $V^{5+}$, $Cr^{3+}$, $Cr^{6+}$, $Mn^{2+}$, $Mn^{3+}$, $Fe^{2+}$, $Co^{2+}$, $Ni^{2+}$, $Cu+$, $Cu^{2+}$, $Mo^{3+}$, and $Mo^{4+}$, particularly at least one cation selected from $Dy^{3+}$, $Er^{3+}$, $Yb^{3+}$, and $Cu^{2+}$. When using excitation light in the 0.8-μm range (a wavelength range of 700 nm to 900 nm), a suitable cation is at least one cation selected from $Dy^{3+}$, $Er^{3+}$, $Nd^{3+}$, $Tm^{3+}$, $Ho^{3+}$, $Ti^{3+}$, $V^{3+}$, $V^{4+}$, $V^{5+}$, $Cr^{3+}$, $Cr^{6+}$, $Mn^{2+}$, $Mn^{3+}$, $Fe^{2+}$, $Co^{2+}$, $Ni^{2+}$, $Cu^+$, $Cu^{2+}$, $Mo^{3+}$, and $Mo^{4+}$ particularly at least one cation selected from $Dy^{3+}$, $Er^{3+}$, $Nd^{3+}$, $Tm^{3+}$, and $Cu^{2+}$.

To increase the desirable sensitization function, the cation having a large absorption coefficient of, for example, 0.05 $cm^-$or more in the target wavelength range should be selected. The above-mentioned cations are selected taking into account their absorption coefficients in the target wavelength ranges. The absorption coefficients of the cations are as follows (unit: $cm^{-1}$) : $Er^{3+}$(0.19), $Yb^{3+}$(3.70), $V^{3+}$, $V^{4+}$and $V^{5+}$(19.00), $Fe^{2+}$(22.86), $Co^{2+}$(0.72), $Ni^{2+}$(10.4), $Cu+$and $Cu^{2+}$(7.46), and $Mo^{3+}$and $Mo^{4+}$(0.45) in the 0.98-μm range; and $Dy^{3+}$(0.20), $Er^{3+}$(0.10), $Nd^{3+}$(1.20), $Tm^{3+}$(0.50), $Ti^{3+}$(2.00), $V^{3+}$, $V^{4+}$and $V^{5+}$(9.00), $Cr^{3+}$and $Cr^{6+}$(0.14), $Mn^{2+}$and $Mn^{3+}$(1.50), $Fe^{2+}$(13.33), $Co^{2+}$(0.45), $Ni^{2+}$(9.77), $Cu+$and $Cu^{2+}$(13.05), and $Mo^{3+}$and $Mo^{4+}$(0.47) in the 0.8-μm range. The absorption coefficients of the above-mentioned other cations also are 0.05 $cm^{-1}$ or more in at least a part of the wavelength range of 700 to 1100 nm.

On the other hand, the absorption coefficients of $Fe^{3+}$, $Pr^{3+}$and $Ti^{4+}$are zero in the 0.98-μm and 0.8-μm ranges. These cations are inadequate as cations to be added for sensitization. However, the glass composition of the present invention may include these components for other purposes or as inevitable impurities.

It should be noted that there are other factors such as the content of the cation in addition to its absorption coefficient that may influence the sensitization function. The absorption coefficient is a main index to the selection of cations, though the sensitization function cannot be determined only by the absorption coefficient.

The glass network former of the glass composition according to the present invention is not particularly limited as long as it can form the glass network together with an anion that is oxygen, for instance. It, however, is preferable that the glass network former be at least one selected from silicon, phosphorus, boron, and germanium and include silicon as its main component. In the present specification, the "main component" denotes a component whose content by percentage is the highest. The content by percentage of the glass network former is preferably 30 to 80% in terms of an oxide thereof A preferable glass composition to be employed in the case where the glass network former contains silicon ($Si^{4+}$) as its main component is described below as an example. The ranges indicated in parentheses are more preferable ranges.

That is, the composition includes components indicated as follows: 30 to 80 (40 to 75)% $SiO_2$; 0 to 40 (0 to 35)% $Li_2O$; 0 to 30 (0 to 20)% $Na_2O$; 0 to 20 (0 to 15)% $K_2O$; 0 to 40 (0 to 30)% MgO; 0 to 40(0 to 30)% CaO; 0 to 30 (0 to 20)% SrO; 0 to 20 (0 to 15)% BaO; 0 to 40 (0 to 30)% $Al_2O_3$; 0 to 40 (0 to 35)% ZnO; 0 to 30 (0 to 20)% $TiO_2$; 0 to 30 (0 to 20)% $ZrO_2$; 0 to 30 (0 to 20)% $Y_2O_3$; 0 to 30 (0 to 20)% $La_2O_3$; and 0 to 40 (0 to 30)% $B_2O_3$, wherein the total of $Li_2O+Na_2O+K_2O+CaO+SrO+BaO+ZnO+B_2O_3$ is in the range of 1 to 60 (10 to 55)%, and the composition further includes 0.01 to 15 (0.01 to 10)% of bismuth in terms of $Bi_2O_3$ and 0.01 to 12 (0.01 to 8)% of $Yb^{3+}$in terms of $Yb_2O_3$.

A particularly preferable composition is as follows.

That is, the composition includes components indicated as follows: 50 to 70% $SiO_2$; 0 to 30% $Li_2O$; 0 to 10% $Na_2O$; 0 to 10% $K_2O$; 0 to 20% MgO; 0 to 20% CaO; 0 to 10% SrO; 0 to 10% BaO; 0 to 20% $Al_2O_3$; 0 to 30% ZnO; 0 to 10% $TiO_2$; 0 to 10% $ZrO_2$; 0 to 10% $Y_2O_3$; 0 to 10% $La_2O_3$; and 0 to 20% $B_2O_3$, wherein the total of $Li_2O+Na_2O+K_2O+CaO+SrO+BaO+ZnO+B_2O_3$ is in the range of 15 to 50%, and the composition further includes 0.01 to 5%, more preferably 0.01 to 2.0%, of bismuth in terms of $Bi_2O_3$ and 0.01 to 5%, more preferably 0.01 to 2.0%, of $Yb^{3+}$in terms of $Yb_2O_3$.

The following description is directed to optional components of the glass composition according to the present invention.

The univalent or divalent metal oxides described above as examples facilitate vitrification. In the glass composition that emits light in the infrared region, preferable divalent and univalent metal oxides are MgO and $Li_2O$, respectively. Particularly, $Li_2O$ improves meltability and increases the refractive index of glass. The addition of a suitable amount of $Li_2O$ increases absorbance and contributes to the increase in infrared emission intensity. Preferably, the glass composition of the present invention includes, for instance, at least 0.1% of at least one selected from MgO and $Li_2O$.

As described above as examples, for instance, at least 0.1% of $B_2O_3$ further may be added to the glass containing silicon as the main component of the glass network former so as to reduce the viscosity of a glass melt and to homogenize the glass. Thus, the glass composition of the present invention may include a plurality of glass network formers.

$Al_2O_3$ is a preferable component that increases the emission intensity. At least 0.1% of $Al_2O_3$ may be added as required. However, when the content by percentage of $Al_2O_3$ is excessively high, the meltability of the glass raw material deteriorates and thereby the glass tends to be devitrified. Accordingly, it is advantageous that the content by percentage of $Al_2O_3$ is limited in the range described above.

In order to facilitate vitrification, it is preferable that at least 3% of divalent metal oxides MO (MO=MgO+CaO+SrO+BaO+ZnO) and univalent metal oxides $R_2O$ ($R_2O=Li_2O+Na_2O+K_2O$) be added. The glass is homogenized more easily with an increase in content by percentage of $MO+R_2O$. On the other hand, when the content by percentage of $MO+R_2O$ exceeds 40%, devitrification tends to occur. Hence, it is preferable that the content by percentage of $MO+R_2O$ be 3% to 40%, particularly 5% to 35%.

Like MgO, CaO improves the meltability of a raw material batch and even a small amount (for instance, 0.1% or more) of CaO improves the devitrification resistance of glass. As in the case of MgO, however, when the content by percentage of CaO is excessively high, glass exhibits a dark blackish brown color and thereby the emission intensity decreases. Like MgO and CaO, SrO also improves meltability of a raw material batch and even a small amount (for instance, 0.1% or more) of SrO improves the devitrification resistance of glass considerably. SrO, however, has a strong effect of rapidly decreasing the intensity of emission provided by bismuth. Like MgO and CaO, BaO also improves meltability of a raw material batch. BaO has a higher effect of improving the refractive index as compared to the other divalent metal oxides. Since the increase in refractive index results in improvement in the luster of a glass surface, the color development also is improved. Hence, it is advantageous that for instance, at least 0.1% of BaO is added. BaO, however, has a strong effect of rapidly decreasing the emission intensity. ZnO also improves meltability of a raw material batch. ZnO is excellent in the effect of allowing the color of glass to develop as compared to CaO, SrO, and BaO. ZnO also is excellent in the effect of improving the refractive index of glass as compared to MgO. With consideration given to this, a small amount (for instance, 0.1% or more) of ZnO may be added. As in the case of MgO, however, when the content by percentage of ZnO is excessively high, glass exhibits a dark blackish brown color and thereby has a decreased emission intensity. When the content by percentage of ZnO is excessively high, glass may suffer phase separation to become cloudy and thereby transparent glass may not be obtained. With consideration given to the above, when the above-mentioned divalent oxides (MO) are to be added, it is advantageous that the contents by percentage of the respective oxides to be added are in the ranges described above as examples.

$Na_2O$ lowers the melting temperature as well as the liquidus temperature and thereby prevents glass from being devitrified. $Na_2O$, however, has a strong effect of weakening fluorescence by making glass dark blackish brown. $K_2O$ lowers the liquidus temperature and thereby prevents glass from being devitrified. $K_2O$, however, weakens fluorescence of glass in the infrared region even when a small amount thereof is added. With consideration given to the above, when the above-mentioned univalent oxides ($R_2O$) are to be added, it is advantageous that the contents by percentage of the respective oxides to be added are in the ranges described above as examples.

$TiO_2$ increases the refractive index of glass and promotes fluorescence. BaO has a strong effect of decreasing the emission intensity while $TiO_2$ has an effect of improving the emission intensity. $TiO_2$, however, has an effect of making glass cloudy. Like $TiO_2$, $ZrO_2$ improves the refractive index of glass and promotes infrared fluorescence. $ZrO_2$, however, has an effect of accelerating crystallization of glass and increasing the density of glass. $Y_2O_3$ has an effect of decreasing the viscosity of glass but also has an effect of devitrifying glass. $La_2O_3$ has an effect of inhibiting concentration quenching but also has an effect of increasing the refractive index to increase coupling loss. Accordingly, it is advantageous that the amounts of these components to be added also are in the ranges described above as examples.

The glass compositions described above as examples may include other components. For instance, for the purpose of controlling the refractive index, controlling temperature viscosity characteristics, inhibiting devitrification, etc., the glass composition may include $Ta_2O_5$, $Nb_2O_5$, and $In_2O_3$, preferably with the total content by percentage thereof being 5% or less. Furthermore, for instance, for the purpose of allowing glass to be clear when it is melted, preventing bismuth from being reduced, etc., the glass composition may include $As_2O_3$, $Sb_2O_3$, $SO_3$, $SnO_2$, $CeO_2$, $Fe_2O_3$, Cl and F, preferably with the total content by percentage thereof being 1% or less.

Components other than those described above may be introduced, as trace amounts of impurities, into a glass raw material. However, when the total content by percentage of such impurities is lower than 1%, the effect to be imposed on the physical properties of the glass composition is small and therefore does not cause any substantial problems.

The glass composition of the present invention may consist essentially of the above-exemplified components with their preferable content ranges on condition that the other components may be permitted to the above-described extent.

From another aspect, the present invention provides an optical fiber including a glass composition of the present invention and a light amplifier including a glass composition of the present invention. From still another aspect, the present invention provides a method of amplifying signal light, wherein excitation light and signal light are allowed to enter a glass composition of the present invention and thereby the signal light is amplified. In order to utilize the characteristics of the glass composition of the present invention, it is advantageous that the wavelength of the excitation light is in the range of 700 nm to 1100 nm (700 to 900 nm or 900 to 1100 nm), further 730 nm to 880 nm or 930 nm to 1070 nm, and particularly 750 nm to 850 nm or 950 nm to 1050 nm. The wavelength of the signal light is preferably in the range of 1100 nm to 1650 nm, more preferably 1150 nm to 1570 nm, and particularly preferably 1200 nm to 1470 nm. The glass composition of the present invention is useful for not only light amplifiers but also near infrared wideband light sources, etc.

Hereinafter, the present invention is described further in detail using examples. First, the method of evaluating characteristics of glass compositions is described.

Fluorescence Spectrum

A glass sample was cut into a size of 20 mm×30 mm×3 mm of thickness, which then was polished to have mirror-finished surfaces and to be a flat sheet whose respective opposing surfaces are in parallel with each other. Thus a sheet sample was produced. The fluorescence spectrum of this sheet sample was measured using a commercial fluorescence spectrophotometer. With respect to excitation light having a wavelength of 980 nm, the measurement was carried out over the range of 1000 nm to 1600 nm of the wavelength of fluorescence luminescence. The sample was allowed to be at room temperature at the time of measurement.

Optical Fiber Amplification Test

The light amplification characteristics of an optical fiber used as a sample were determined using a measuring apparatus shown in FIG. 1.

The wavelength of excitation light 11 to serve as an energy source for amplifying light was 980 nm while the wavelength of signal light 12 to be amplified was 1314 nm. In this apparatus, the excitation light 11 and the signal light 12 are led through a lens 3 to an optical fiber end 2 that is a part from which light enters the core of an optical fiber 1, and then enter the optical fiber 1 while they are superposed spatially on each other in the vicinity of the optical fiber end 2. The signal light 13 that has passed through the optical fiber 1 has been amplified by the excitation light 11. The optical fiber 1 was cut to have sections that were specular surfaces.

Semiconductor lasers were used for respective light sources 21 and 22 of the excitation light 11 and the signal light 12. The excitation light 11 and the signal light 12 were multiplexed using a wavelength selection reflector 5. This reflector 5 was configured so as to transmit the signal light 12 but reflect the excitation light 11.

The signal light 13 that came out from the optical fiber 1 was led to a photodetector 23 through a lens 4. A filter 6 that transmits the amplified signal light 13 but intercepts the excitation light 11 was inserted in a position on the optical path. This allowed only the signal light 13 to be detected by the photodetector 23. The intensity of the signal light 13 thus detected was measured with an oscilloscope 24. The light amplification phenomenon can be checked through a comparison made between the intensity of the signal light 13 obtained when only the signal light 12 was allowed to enter the optical fiber 1 and the intensity of the signal light 13 obtained when the signal light 12 was allowed to enter the optical fiber 1 together with the excitation light 11.

In the optical system shown in FIG. 1, the direction in which the excitation light 11 traveled was the same as the direction in which the signal light 12 traveled. The optical system, however, is not limited thereto. For instance, the directions in which the respective lights travel may be opposite to each other. The excitation light 11 and the signal light 12 may be multiplexed using a reflector that reflects the signal light 12 but transmits the excitation light 11 or using a means other than the reflector.

FIG. 1 shows an example of evaluation apparatus and also shows a configuration example of the light amplification apparatus of the present invention. As described above as an example, the light amplification apparatus may be provided with a light source of the excitation light and a light source of the signal light together with a glass composition of the present invention. The configuration of the light amplification apparatus is not limited to that shown in FIG. 1. For instance, a signal-input optical fiber and a signal-output optical fiber may be disposed instead of the light source of the signal light and the photodetector, respectively. In addition, the excitation light and the signal light may be multiplexed/demultiplexed using a fiber coupler, etc.

EXAMPLE 1

Silicon oxide, lithium carbonate, bismuth trioxide, and ytterbium oxide, which were used generally as raw materials, were weighed so that the respective compositions shown in Table 1 were obtained. Then raw material batches were prepared.

Each batch thus prepared was put into an alumina crucible and was maintained in an electric furnace at 1500° C. for four hours. Thereafter, the batch was cast on an iron plate to be cooled. After this glass was maintained in an electric furnace at 500° C. for 30 minutes, the power of the furnace was turned off and the glass then was cooled slowly to room temperature. Thus, glass samples (Samples 1 to 3) were obtained.

Figure 2:
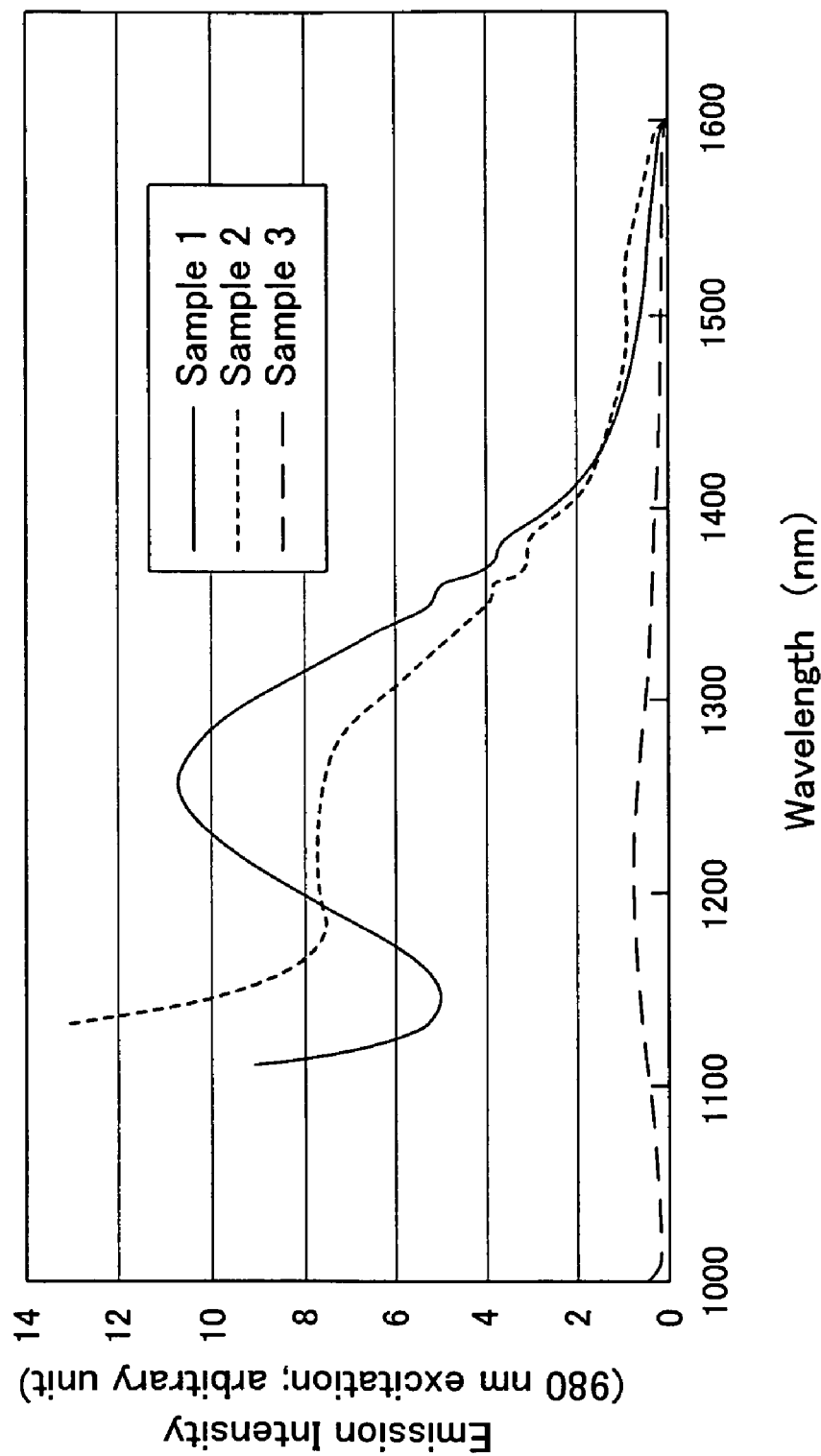
FIG. 2 is a graph showing examples of fluorescence spectra obtained in glass compositions of the present invention.

With respect to these glass samples, the fluorescence spectra were measured using excitation light with a wavelength of 980 nm. The results are shown in FIG. 2. As shown in FIG. 2, strong emission was obtained over broad wavelength regions in Samples 1 and 2. Fluorescence also was observed in Sample 3 but the fluorescence emission intensity was far lower than those of Samples 1 and 2.

TABLE 1

|  | Sample 1 | Sample 2 | Sample 3 |
| --- | --- | --- | --- |
|  |  |  | (mol %) |
| $SiO_2$ | 65.5 | 68.5 | 69.5 |
| $Li_2O$ | 30 | 30 | 30 |
| $Bi_2O_3$ | 0.5 | 0.5 | 0.5 |
| $Yb_2O_3$ | 4 | 1 | 0 |

EXAMPLE 2

Figure 4:
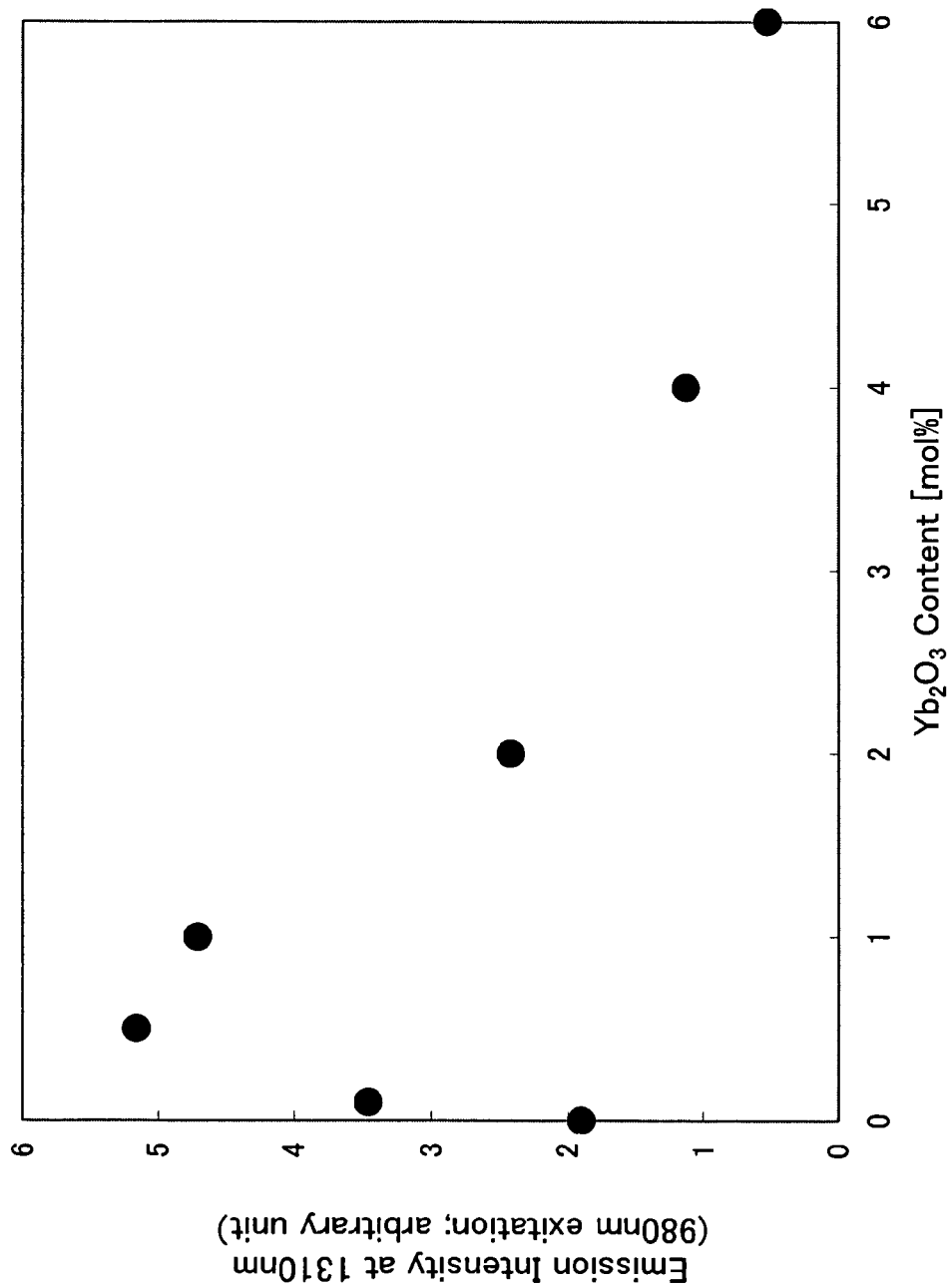
FIG. 4 is a graph showing a relationship between the content of ytterbium and the emission intensity.
Figure 5:
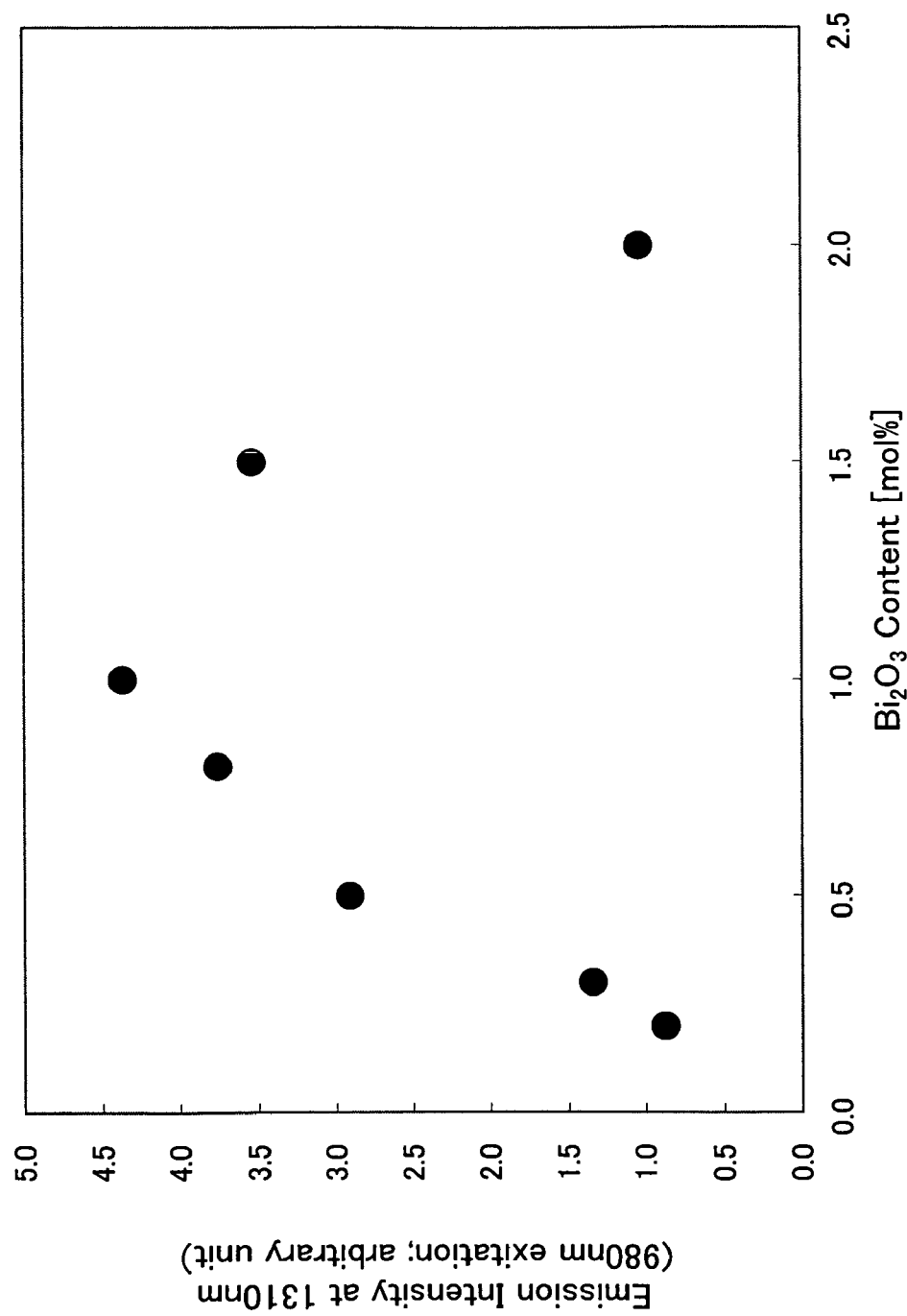
FIG. 5 is a graph showing a relationship between the content of bismuth and the emission intensity.

Glass samples were prepared in the same manner as in Example 1 except for their raw material batches. The fluorescence spectra were measured in the same manner as in Example 1 to obtain the emission intensities at a wavelength of 1310 nm. The contents of $Yb_2O_3$ were different among the compositions of Samples 11 to 17 (see Table 2), and the contents of $Bi_2O_3$ were different among the compositions of Samples 21 to 27 (see Table 3). FIG. 4 shows the relationship between the $Yb_2O_3$ content and the emission intensity and FIG. 5 shows the relationship between the $Bi_2O_3$ content and the emission intensity.

TABLE 2

|  | Sample No. | | | | | | (mol %) |
| --- | --- | --- | --- | --- | --- | --- | --- |
|  | 11 | 12 | 13 | 14 | 15 | 16 | 17 |
| $SiO_2$ | 59.78 | 59.68 | 59.28 | 58.78 | 57.78 | 55.78 | 53.78 |
| $Li_2O$ | 15.69 | 15.69 | 15.69 | 15.69 | 15.69 | 15.69 | 15.69 |
| $MgO$ | 15.69 | 15.69 | 15.69 | 15.69 | 15.69 | 15.69 | 15.69 |
| $Al_2O_3$ | 7.84 | 7.84 | 7.84 | 7.84 | 7.84 | 7.84 | 7.84 |
| $Bi_2O_3$ | 1.00 | 1.00 | 1.00 | 1.00 | 1.00 | 1.00 | 1.00 |
| $Yb_2O_3$ | 0 | 0.10 | 0.50 | 1.00 | 2.00 | 4.00 | 6.00 |

TABLE 3

|  | Sample No. | | | | | | (mol%) |
| --- | --- | --- | --- | --- | --- | --- | --- |
|  | 21 | 22 | 23 | 24 | 25 | 26 | 27 |
| $SiO_2$ | 73.65 | 73.58 | 73.43 | 73.21 | 73.07 | 72.71 | 72.35 |
| $Li_2O$ | 9.95 | 9.94 | 9.92 | 9.89 | 9.87 | 9.83 | 9.78 |
| $MgO$ | 0.18 | 0.17 | 0.17 | 0.17 | 0.17 | 0.17 | 0.17 |
| $ZrO_2$ | 1.00 | 0.99 | 0.99 | 0.99 | 0.99 | 0.98 | 0.98 |
| $Al_2O_3$ | 14.93 | 14.91 | 14.88 | 14.84 | 14.81 | 14.74 | 14.67 |
| $Bi_2O_3$ | 0.20 | 0.30 | 0.50 | 0.79 | 0.99 | 1.48 | 1.96 |
| $Yb_2O_3$ | 0.10 | 0.10 | 0.10 | 0.10 | 0.10 | 0.10 | 0.10 |

As shown in FIG. 4, the emission intensity was increased in the $Yb_2O_3$ content range of 0.01 to 2.0%. As shown in FIG. 5, the emission intensity was increased in the $Bi_2O_3$ content range of 0.01 to 2.0%.

EXAMPLE 3

An optical fiber was produced and the light amplification characteristics thereof were determined. The composition of the core glass of the optical fiber was as follows: 58.8% $SiO_2$; 7.8% $Li_2O$; 15.7% MgO; 7.8% CaO; 7.8% $Al_2O_3$; 1.0% $Bi_2O_3$; and 1.0% $Yb_2O_3$. Clad glass had a composition that was the same as that of the core glass except that $Bi_2O_3$ and $Yb_2O_3$ were excluded. The core diameter was 80 μm. The optical fiber was cut into a length of 95 cm to have sections that were specular surfaces. The optical fiber thus obtained was used.

Figure 3:
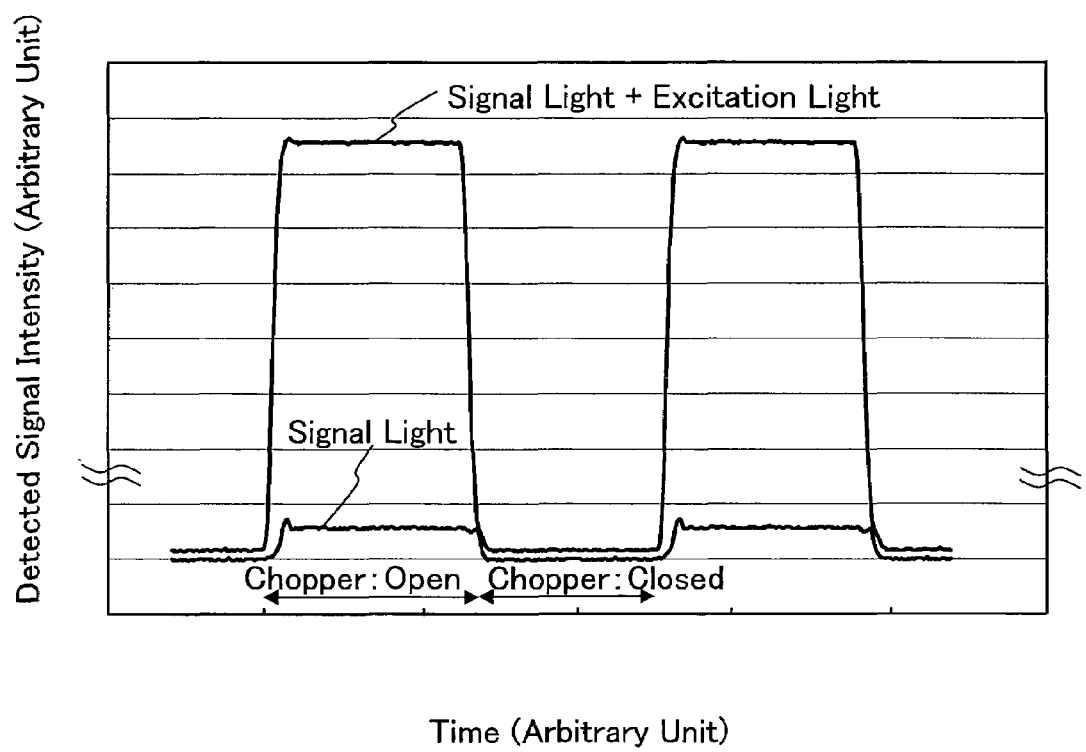
FIG. 3 is a graph showing an example of light signal amplification carried out using a glass composition of the present invention.

Using the apparatus shown in FIG. 1, intermittent irradiation of excitation light with a wavelength of 980 nm was carried out with a chopper (omitted in FIG. 1) at a constant intensity and in a constant cycle while signal light with a wavelength of 1314 nm was allowed to enter. As a result, the intensity of the signal light increased during the irradiation of excitation light (see FIG. 3). The intensity of the signal light increased about 65 times through the irradiation of the excitation light.

As described above, the present invention makes it possible to obtain high emission intensities in the 1.3-μm range through the excitation caused by light in the 0.8-μm range and the 0.98-μm range, which are the excitation wavelengths that are highly useful, particularly in the 0.98-μm range, using a glass composition including, as a fluorescent element, bismuth that emits light in a broad wavelength region.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A glass composition consisting of the following components, indicated by mol %:

30 to 80 $SiO_2$;
0 to 40 $Li_2O$;
0 to 30 $Na_2O$;
0 to 20 $K_2O$;
0 to 40 $MgO$;
0 to 40 $CaO$;
0 to 30 $SrO$;
0 to 20 $BaO$;
0 to 40 $Al_2O_3$;
0 to 40 $ZnO$;
0 to 30 $TiO_2$;
0 to 30 $ZrO_2$;
0 to 30 $Y_2O_3$;
0 to 30 $La_2O_3$;
0 to 20 $B_2O_3$;
0.01 to 2 bismuth in terms of $Bi_2O_3$; and
0.01 to 12 of at least one cation selected from the group consisting of $Dy^{3+}$, $Er^{3+}$, $Yb^{3+}$, $Nd^{3+}$, $Tm^{3+}$, $Ho^{3+}$, $Ti^{3+}$, $V^{3+}$, $V^{4+}$, $V^{5+}$, $Cr^{3+}$, $Cr^{6+}$, $Mn^{2+}$, $Mn^{3+}$, $Fe^{2+}$, $Co^{2+}$, $Ni^{2+}$, $Cu^{+}$, $Cu^{2+}$, $Mo^{3+}$, and $Mo^{4+}$ in terms of oxide of the at least one cation, wherein the total of $Li_2O+Na_2O+K_2O+CaO+SrO+BaO+ZnO+B_2O_3$ is in a range of 0.1 to 60 mol %, the glass composition emits fluorescence in an infrared wavelength region, with the bismuth functioning as a fluorescent source through irradiation of excitation light, and the total content by percentage of impurities is lower than 1 mol %.

2. The glass composition according to claim 1, wherein the cation is $Yb^{3+}$.

3. The glass composition according to claim 2, wherein the content of $Yb^{3+}$ is in a range of 0.01 to 2.0 mol % in terms of $Yb_2O_3$.

* * * * *